United States Patent [19]

Norimatsu et al.

[11] 4,251,990
[45] Feb. 24, 1981

[54] AIR-FUEL RATIO CONTROL SYSTEM

[75] Inventors: Hideaki Norimatsu, Toyohashi; Masahiko Tajima, Takahama, both of Japan

[73] Assignee: Nippondenso Co., Ltd., Kariya, Japan

[21] Appl. No.: 59,328

[22] Filed: Jul. 20, 1979

[30] Foreign Application Priority Data

Sep. 5, 1978 [JP] Japan ................ 53-108934

[51] Int. Cl.³ .............................. F01N 3/15
[52] U.S. Cl. ........................ 60/276; 60/285; 123/440; 123/489
[58] Field of Search ............. 60/276, 285; 123/32 EE, 123/119 EC

[56] References Cited
U.S. PATENT DOCUMENTS

| | | | |
|---|---|---|---|
| 3,782,347 | 1/1974 | Schmidt | 60/276 |
| 3,875,907 | 4/1975 | Wessel | 60/276 |
| 3,939,654 | 2/1976 | Creps | 60/276 |
| 3,990,411 | 11/1976 | Toelle | 60/276 |
| 4,007,589 | 2/1977 | Neidhard | 60/276 |
| 4,130,095 | 12/1978 | Bowler | 60/276 |

Primary Examiner—Douglas Hart
Attorney, Agent, or Firm—Cushman, Darby & Cushman

[57] ABSTRACT

An air-fuel ratio control system comprises a first oxygen concentration detector arranged upstream of a three-way catalyst for purifying the exhaust gas in the exhaust system of an internal combustion engine, a second oxygen concentration detector arranged downstream of the three-way catalyst, a discrimination circuit for detecting and discriminating a specific operating condition of the internal combustion engine in response to a signal representing operating factors of the internal combustion engine such as the amount of intake air and vehicle speed, and a change-over circuit impressed with the signals from the first and second oxygen concentration detectors. The change-over circuit produces selectively the detection signal of the second oxygen concentration detector in response to the output signal of the discrimination circuit only when the discrimination circuit detects a predetermined operating condition of the internal combustion engine, and the detection signal of the first oxygen concentration detector when the internal combustion engine is under the other operating conditions.

3 Claims, 5 Drawing Figures

AIR-FUEL RATIO CONTROL SYSTEM

BACKGROUND OF THE INVENTION

1. Field of the Invention

The present invention relates to an air-fuel ratio control system which is capable of accurate control of the air-fuel ratio regardless of a change in the characteristics of an oxygen concentration detector in the negative feedback control of the air-fuel ratio by detection of the oxygen concentration of the exhaust gas for purifying the exhaust gas of an automobile internal combustion engine.

2. Description of the Prior Art

The purifying ability of the catalyst is very high when the air-fuel ratio of the mixture gas is at or near the predetermined stoichiometric air-fuel ratio (air excess rate $\lambda = 1$). In view of this, in a conventional system suggested for purifying the exhaust gas by use of a three-way catalyst in the exhaust system of the internal combustion engine, the oxygen concentration in the exhaust gas representing the air-fuel ratio of the mixture gas is detected by an oxygen concentration detector (hereinafter may be referred to as the oxygen sensor) and the air-fuel ratio of the mixture gas is controlled to about the stoichiometric air-fuel ratio by negative feedback. The output characteristics of this oxygen sensor, however, greatly vary with time or according to production processes. In the case where this oxygen sensor is placed upstream of the three-way catalyst in the exhaust system of an internal combustion engine, the output characteristics thereof in relation to the air-fuel ratio vary between the oxygen sensors S1 and S2, for example, as shown in FIG. 1A. Therefore, even if a reference level Vs is set corresponding to the target stoichiometric air-fuel ratio ($\lambda = 1$) for negative feedback control, an accurate control of the stoichiometric air-fuel ratio may be attained for the oxygen sensor S1, while an air-fuel ratio lower than the stoichiometric air-fuel ratio is attained for the other oxygen sensor S2, thus resulting in the loss of the effect of the three-way catalyst.

In the case where the oxygen sensor is disposed downstream of the three-way catalyst, on the other hand, it was confirmed that as shown in FIG. 1B, the curves of the detection voltage characteristics with respect to the air-fuel ratio pass the set reference level Vs at or near the stoichiometric air-fuel ratio. In this way, the oxygen sensor may be placed downstream of the three-way catalyst for negative feedback control of the air-fuel ratio, but in this case it is apparent that a system response delay occurs unlike in the case where the oxygen sensor is placed upstream of the three-way catalyst.

SUMMARY OF THE INVENTION

The present invention has been developed in view of the above-mentioned various points and it is an object of the present invention to provide an air-fuel ratio control system comprising a first oxygen sensor disposed upstream of a three-way catalyst in the exhaust system of the internal combustion engine, a second oxygen sensor disposed downstream of the three-way catalyst, means for discriminating a specific engine operating condition such as a high load or high speed from a signal representing an engine operating factor such as the amount of intake air or vehicle speed, means for effecting feedback-control of the air-fuel ratio in response to the detection signal of the second oxygen sensor, only under the specific operating condition and means for effecting feedback-control of the air-fuel ratio by the detection signal of the first oxygen sensor under the other operating conditions, thus compensating for the variations in the oxygen sensors on the one hand and eliminating the problem of response delay of the system on the other hand.

DETAILED DESCRIPTION OF THE PREFERRED EMBODIMENTS

Figure 2:
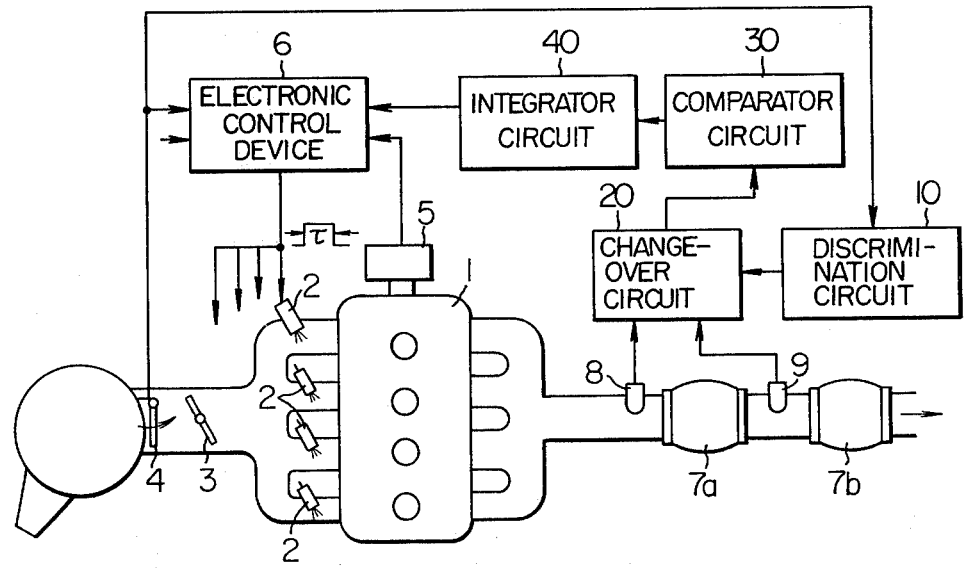
FIG. 2 is a block diagram partially including illustration of mechanism showing an embodiment of the present invention.

An embodiment of the present invention shown in the attached drawings will be described below. In FIG. 2, reference numeral 1 shows an internal combustion of multiple cylinder type, the intake manifold of which has fuel injection valves 2 electromagnetically operated. A throttle valve 3 and an intake amount detector 4 are arranged upstream of the fuel injection valves 2. Numeral 6 shows and electronic control device impressed with detection signals from the intake amount detector 4, the r.p.m. detector 5 and other devices such as a temperature detector. The electronic control device 6 applies to the fuel injection valves 2 a pulse signal with a time width $\tau$ corresponding to the detection value of each detector, thereby regulating the amount of fuel supply to the internal combustion engine 1. Numeral 7a shows a three-way catalyst for engine starting operation, which is disposed in the exhaust system of the internal combustion engine 1. This starting three-way catalyst is sufficiently small in thermal capacity to be warmed up quickly after engine start so that it purifies the CO, HC and NOx components of the exhaust gas immediately following engine start. Numeral 7b shows a main three-way catalyst arranged downstream of the starting three-way catalyst. Numeral 8 shows a first oxygen concentration detector (oxygen sensor) placed upstream of the starting three-way catalyst 7a. Numeral 9 shows a second oxygen concentration detector (oxygen sensor) placed downstream of the starting three-way catalyst and upstream of the main three-way catalyst 7b. Numeral 10 shows a discrimination circuit for detecting and discriminating a high intake amount of the engine (high load condition) in response to a signal from the intake amount detector 4 for detecting the engine intake amount. Numeral 20 shows a change-over circuit. In response to detection signals from the first and second oxygen sensors 8 and 9 and a discrimination signal from the discrimination circuit 10, the change-over circuit 20 selects to supply a detection signal of the second oxygen sensor 9 in response to the discrimination signal of the discrimination circuit 10 under a predetermined engine operating condition or under high intake amount, while the change-over circuit 20 selects to supply the detection signal from the first oxygen sensor 8 under the other operating conditions. Numeral 30 shows a well-known comparator circuit which, in response to the detection signal of one of the oxygen sensors selected by the change-over circuit 20, compares this detection signal with a predetermined reference level corresponding to a predetermined air-fuel ratio and determines whether the actual air-fuel ratio is higher (lean) or lower (rich) than the predetermined air-fuel ratio. Numeral 40 shows a well-known integrator circuit for producing an integration output signal which is increased or decreased in accordance with the lean or rich signal obtained by comparison and determination in the comparator circit 30. The electronic control device 6 functions as an air-fuel ratio regulator means for controlling the air-fuel ratio to the predetermined value by corrective multiplication of the time width $\tau$ of the pulse signal determining the fuel injection amount in response to the output voltage of the integrator circuit 40. This electronic control device 6 is well known from various reference materials and therefore will not be described in detail here. In place of this electronic control device 6, the amount of fuel supply or amount of air to the carburetor or the amount of secondary air supplied to the engine exhaust system may alternatively be regulated as an air-fuel ratio regulator means.

Figure 3:
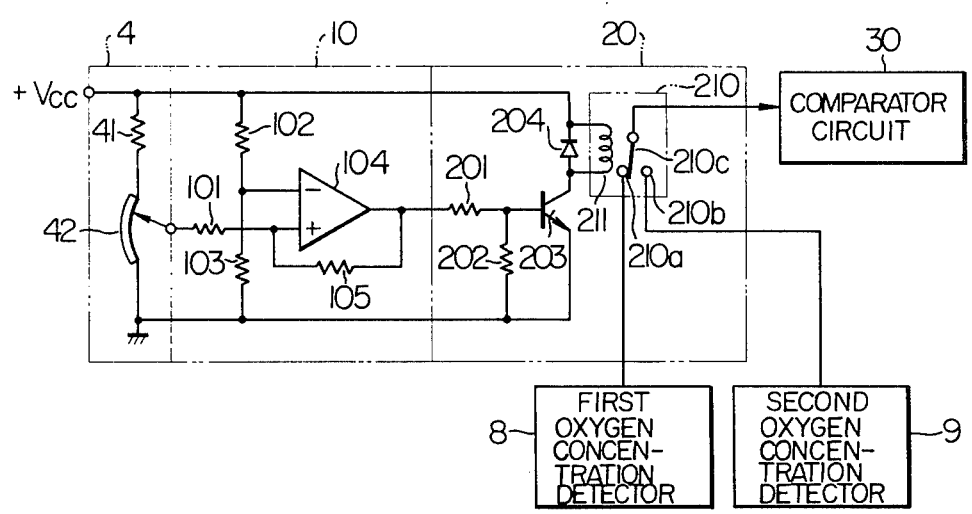
FIG. 3 is an electrical circuit diagram showing the detailed configuration of the essential parts of the circuit shown in blocks in FIG. 2.

The diagram of FIG. 3 shows a detailed electrical circuit of the essential parts shown in FIG. 2, including the intake amount detector 4, the discrimination circuit 10 and the change-over circuit 20. The intake amount detector 4 includes a resistor 41 and a potentiometer 42. The discrimination circuit 10 includes an input resistor 101 connected to the intake amount detector 4, level-setting resistors 102 and 103, a comparator 104, and a feedback resistor 105 for forming hysteresis for the comparator 104. The change-over circuit 20 includes resistors 201 and 202, a transistor 203, a protective diode 204 and a relay 210. The relay 210, in turn, includes a relay coil 211, a contact 210a connected to the first oxygen sensor 8, a contact 210b connected to the second oxygen sensor 9 and a movable contact 210c connected to the comparator circuit 30. The reference character +Vcc in FIG. 3 shows a constant voltage.

Figure 1A:
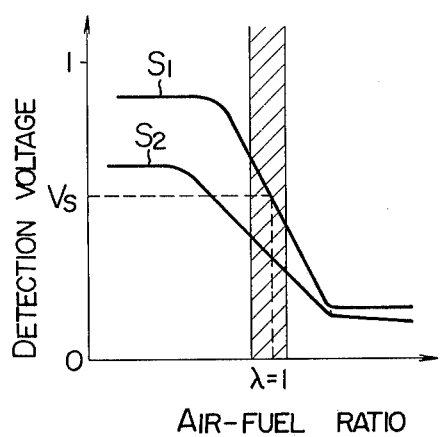
FIGS. 1A and 1B are characteristic diagrams showing output changes, with respect to the air-fuel ratio, for the oxygen concentration sensors disposed upstream and downstream of the three-way catalyst respectively.

Next, operation of the system of the above-mentioned configuration will be explained. When the amount of intake of the engine which is detected by the detector 4 is lower than a predetermined amount of air corresponding to the set level determined by the resistors 102 and 103 of the discrimination circuit 10, i.e., under a low intake condition, the output of the comparator 104 of the discrimination circuit 10 is at low level, so that the transistor 203 of the change-over circuit 20 is cut off. As a result, current fails to flow through the coil 211 of the relay 210, and the change-over contact 210c is connected to the contact 210a. Thus the change-over circuit 20 supplies the detection signal of the first oxygen sensor 8 to the comparator circuit 30, with the result that the air-fuel ratio is controlled by feedback to a predetermined value by the comparator circuit 30, integrator circuit 40 and electronic control device 6 in a manner as well known. Under the low intake condition of the engine 1, the detection response delay of the second oxygen sensor 9 is so great that any attempt to control it by feedback of the detection signal of the second oxygen sensor 9 fails because of hunting or the like. This makes necessary a feedback control by the detection signal from the first oxygen sensor 8. As described with reference to FIG. 1A and also first above, possible characteristic variation from a desired characteristic in the first oxygen sensor 8 results in variations in the controlled air-fuel ratio, thereby somewhat reducing the purifying capacity of the main three-way catalyst 7b. In spite of this, under the low intake condition of the engine, the amount of obnoxious components of the exhaust gas is low and therefore the discharge amount of the obnoxious components is not increased.

Figure 1B:
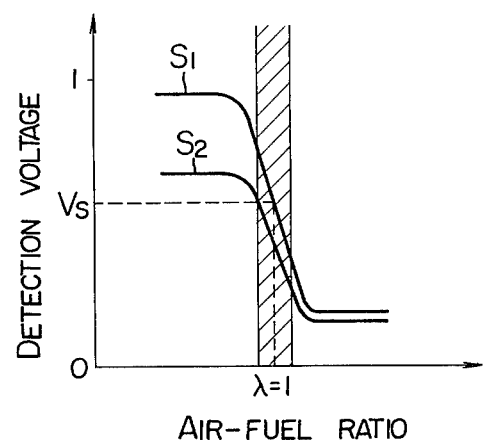

When the intake amount of the engine 1 is higher than the predetermined value, i.e., under the high intake condition, the output of the comparator 104 of the discrimination circuit 10 is at high level. The transistor 203 of the change-over circuit 20 conducts, the current flows through the coil 211 of the relay 210, the change-over contact 210c is connected with the contact 210b, and therefore the change-over circuit 20 supplies the comparator circuit 30 with the detection signal from the second oxygen sensor 9. As a result, the air-fuel ratio is feedback-controlled to a predetermined value by the comparator circuit 30, integrator circuit 40 and electronic control device 6 in a manner as well known. In other words, under the high intake condition of the engine 1, the detection response delay of the second oxygen sensor 9 is very low, and therefore the response delay in the feedback control poses no problem of hunting, etc. Further, as described with reference to FIG. 1B and first above, the second oxygen sensor 9 is disposed downstream of the starting three-way catalyst 7a, and therefore the variation in air-fuel ratio detection point due to characteristics variations between different sensors, i.e., variations in controlled air-fuel ratio are made very low. Thus it is possible to purify the exhaust gas very efficiently with the main three-way catalyst 7b, thereby extremely reducing the discharge amount of the obnoxious components of the exhaust gas.

In the above-described embodiment, whether the amount of intake is low or high is detected by use of a signal from the intake amount detector 4 provided as means for detecting the engine operating condition. As an alternative, another detector means may be used to detect whether the engine r.p.m. is high or low or whether the vehicle speed is high or low as shown in the embodiment of FIG. 4.

Figure 4:
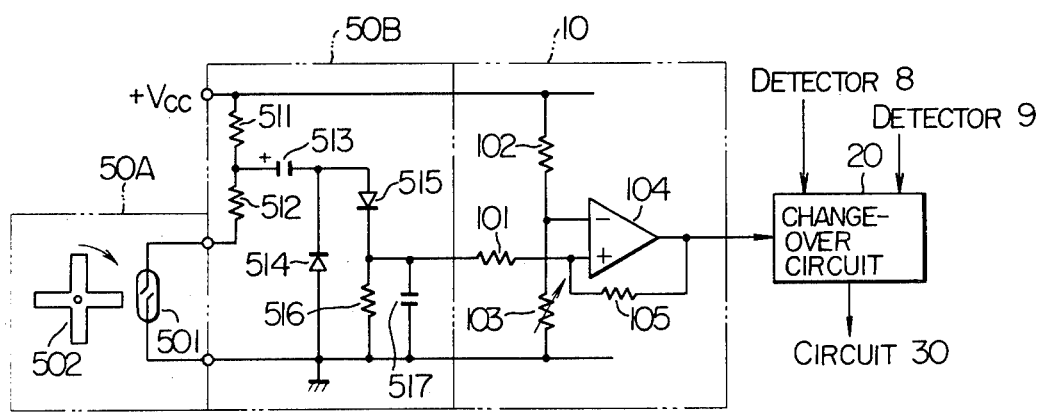
FIG. 4 is an electrical circuit diagram showing the essential parts of another embodiment of the present invention.

In the embodiment of FIG. 4, a vehicle speed sensor 50A and a vehicle speed detector circuit 50B connected to the discrimination circuit 10 are provided in place of the intake amount detector 4 in the emboidment of FIG. 2, the other parts of the configuration being the same as in the embodiment of FIG. 2. As well known, the vehicle speed sensor 50A includes a reed switch 501 contained in the speed meter of the automobile. The reed switch 501 is operated in synchronism with the wheels by a magnetic member of a rotor 502 to which rotation of the gear connected to the wheels is transmitted through a meter cable. The vehicle speed detector circuit 50B comprises resistors 511, 512 and 516, capacitors 513 and 517 and diodes 514 and 515. An operating signal proportional to the vehicle speed applied from the vehicle speed sensor 50A, i.e., the reed switch 501 is converted into an analog signal and applied from the terminal of the capacitor 517 to the discrimination circuit 10.

In the embodiment of FIG. 4, the change-over circuit 20 supplys a detection signal from the first oxygen sensor 8 when the vehicle speed is lower than the setting value depending on the resistors 102 and 103 of the discrimination circuit 10 (at low vehicle speed). On the other hand, the change-over circuit 20 supplies the detection signal from the second oxygen sensor when the vehicle speed is higher than the setting (at high speed). Thus as in the above-mentioned first embodiment, the variations in oxygen sensor are compensated on the one hand and the problem of the system response delay is eliminated on the other hand, thereby most suitably purifying the obnoxious components of the exhaust gas through the main three-way catalyst 7b.

As described above, the control system according to the present invention comprises a first oxygen sensor (oxygen concentration detector) diposed upstream of the three-way catalyst for purifying the exhaust gas in the exhaust system of the internal combustion engine, a second oxygen sensor (oxygen concentration detector) disposed downstream of the three-way catalyst, a discrimination circuit for detecting and discriminating a specific operating condition of the internal combustion engine in response to a signal representing an operating factor of the internal combustion engine, and a change-over circuit impressed with the signal from the first and second oxygen sensors, the change-over circuit supplying the detection signal of the second oxygen sensor in response to an output signal of the discrimination circuit when it detects a specific operating condition of the internal combustion engine, the change-over circuit supplying the detection signal of the first oxygen sensor when the internal combustion engine is in the other operating conditions. This leads to the great advantages that with the variations of oxygen sensors being compensated, the problem of detection response delay which otherwise might occur due to the disposition of the oxygen sensor downstream of the three-way catalyst is eliminated on the one hand and the obnoxious components of the engine exhaust gas are satisfactorily purified on the other hand.

We claim:

1. An air-fuel ratio control system comprising:

first means disposed upstream of a three-way catalyst for purifying the exhaust gas in the exhaust system of an internal combustion engine, said first means detecting the oxygen concentration upstream of said three-way catalyst and generating a first signal indicative of the detected concentration;

second means disposed downstream of said three-way catalyst, said second means detecting the oxygen concentration downstream of said three-way catalyst and generating a second signal indicative of the detected concentration;

third means for discriminating a signal indicative of an operating factor of the internal combustion engine in order to generate a third signal indicative of a predetermined operating condition of the internal combustion engine in which a system response delay is small;

fourth means connected to said first, second and third means for supplying said second signal in response to said third signal and for supplying said first signal in the absence of said third signal; and fifth means for controlling the air-fuel ratio of mixture supplied to said internal combustion engine in response to the signal supplied from said fourth means.

2. An air-fuel ratio control system according to claim 1, further comprising means for detecting the amount of intake air, including a potentiometer, said means producing a signal indicative of said operating factor of the internal combustion engine.

3. An air-fuel ratio control system according to claim 1, further comprising magnetic r.p.m. detector means for operating in synchronism with the rotation of engine and digital/analog converter means, said magnetic r.p.m. detector means and said digital/analog converter means producing a signal indicative of said operating factor of the internal combustion engine.

* * * * *